United States Patent
Iriyama

(10) Patent No.: US 9,893,350 B2
(45) Date of Patent: Feb. 13, 2018

(54) LITHIUM SECONDARY BATTERY

(71) Applicant: NEC Corporation, Tokyo (JP)

(72) Inventor: Jiro Iriyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/772,341

(22) PCT Filed: Mar. 4, 2014

(86) PCT No.: PCT/JP2014/055508
§ 371 (c)(1),
(2) Date: Sep. 2, 2015

(87) PCT Pub. No.: WO2014/136794
PCT Pub. Date: Sep. 12, 2014

(65) Prior Publication Data
US 2016/0036051 A1 Feb. 4, 2016

(30) Foreign Application Priority Data

Mar. 5, 2013 (JP) ................. 2013-043444

(51) Int. Cl.
H01M 4/38 (2006.01)
H01M 10/052 (2010.01)
H01M 10/0567 (2010.01)
H01M 4/13 (2010.01)
H01M 4/36 (2006.01)
H01M 4/58 (2010.01)
H01M 4/62 (2006.01)
H01M 10/058 (2010.01)
H01M 4/02 (2006.01)

(52) U.S. Cl.
CPC ............ H01M 4/38 (2013.01); H01M 4/13 (2013.01); H01M 4/366 (2013.01); H01M 4/5815 (2013.01); H01M 10/052 (2013.01); H01M 10/0567 (2013.01); H01M 4/62 (2013.01); H01M 10/058 (2013.01); H01M 2004/028 (2013.01); H01M 2300/0025 (2013.01)

(58) Field of Classification Search
CPC ............ H01M 4/133; H01M 10/0567; H01M 4/0445; H01M 4/366; H01M 4/587; H01M 10/052; H01M 10/0525; H01M 10/058; H01M 4/583; H01M 10/04; H01M 4/1393; H01M 2300/0025; H01M 2004/021; H01M 2004/027; H01M 10/446

See application file for complete search history.

(56) References Cited

U.S. PATENT DOCUMENTS

| 2006/0292452 | A1 | 12/2006 | Utsugi et al. | |
|---|---|---|---|---|
| 2007/0117024 | A1* | 5/2007 | Nakai | H01M 4/133 429/246 |
| 2007/0154815 | A1* | 7/2007 | Kawasaki | H01M 4/131 429/340 |
| 2007/0292764 | A1 | 12/2007 | Soma et al. | |
| 2010/0028768 | A1* | 2/2010 | Morita | H01M 2/1653 429/144 |
| 2012/0164525 | A1* | 6/2012 | Endoh | H01M 4/131 429/203 |
| 2012/0301796 | A1 | 11/2012 | Ohtomo et al. | |
| 2013/0011747 | A1* | 1/2013 | Sasaki | C01B 31/02 429/336 |
| 2015/0303518 | A1 | 10/2015 | Iriyama | |

FOREIGN PATENT DOCUMENTS

| CN | 101090152 A | 12/2007 |
|---|---|---|
| EP | 2 157 639 A1 | 2/2010 |
| EP | 2916374 A1 | 9/2015 |
| JP | H02-030070 A | 1/1990 |
| JP | 2000-123880 A | 4/2000 |
| JP | 2001-256966 A | 9/2001 |
| JP | 2005-203342 A | 7/2005 |
| JP | 2006-156021 A | 6/2006 |
| JP | 2006-228439 A | 8/2006 |
| JP | 2006-302756 A | 11/2006 |
| JP | 2007-052935 A | 3/2007 |
| JP | 2008-270086 A | 11/2008 |
| JP | 2009-054583 A | 3/2009 |
| JP | 2010-010080 A | 1/2010 |
| JP | 2011-129312 A | 6/2011 |
| WO | WO-2005/029613 A1 | 3/2005 |

OTHER PUBLICATIONS

International Search Report corresponding to PCT/JP2014/055508, dated Apr. 22, 2014 (5 pages).
Xiaoxi Zuo, et al., "Electrochemical Reduction of 1,3-Propane Sultone on Graphite Electrodes and Its Application in Li-Ion Batteries," Electrochemical and Solid-State Letters, 9(4) (2006), pp. A196-A199.

(Continued)

Primary Examiner — Muhammad S Siddiquee
(74) Attorney, Agent, or Firm — Wilmer Cutler Pickering Hale & Dorr

(57) ABSTRACT

The present invention relates to a lithium secondary battery, wherein a peak at 167 to 171 eV and a peak at 162 to 166 eV are present in XPS analysis of sulfur (S2p) of a positive electrode surface, and P169/P164 is in the range of 0.7 to 2.0 wherein the P 169/P 164 is the ratio between the intensity of the peak at 167 to 171 eV (P169) and the intensity of the peak at 162 to 166 eV (P164). The present invention can provide a lithium secondary battery having excellent cycle characteristics.

3 Claims, 3 Drawing Sheets

(56) References Cited

OTHER PUBLICATIONS

Extended European Search Report issued by the European Patent Office for Application No. 14760857.4 dated Jun. 27, 2016 (7 pages).
Chinese Notification of First Office Action issued in corresponding Chinese Application No. 201480011803.5, dated Sep. 12, 2016, 12 pages.

* cited by examiner

LITHIUM SECONDARY BATTERY

CROSS-REFERENCE TO RELATED APPLICATIONS

This application is a national stage application of International Application No. PCT/JP2014/055508 entitled "Lithium Secondary Battery," filed on Mar. 4, 2014, which claims priority to Japanese Patent Application No. 2013-043444, filed on Mar. 5, 2013, the disclosures of each which are hereby incorporated by reference in their entirety.

TECHNICAL FIELD

The present invention relates to a lithium secondary battery and a method for producing the same.

BACKGROUND ART

A various types of lithium secondary batteries have been proposed up to now. For example, Patent Literature 1 discloses a non-aqueous electrolyte secondary battery comprising a substance having a peak from 162.9 to 164.0 eV by XPS analysis on the negative electrode surface, wherein, when peak division of the photoelectron spectrum from XPS analysis of the negative electrode surface is performed, the ratio (Cc/Cs) between the carbon concentration Cc (atom %) and the sulfur concentration Cs (atom %) is 5 or more and 50 or less; and the ratio ($Cs_{164}$/Cs) between the sulfur concentration Cs (atom %) and the concentration $Cs_{164}$ of the substance having a peak from 162.9 to 164.0 eV (atom %) is 0.001 or more and 0.2 or less; the substance having a peak from 162.9 to 164.0 eV comprises a decomposed substance of a compound represented by the formula (1); and further, an electrolyte comprising a sultone compound represented by the formula (2) at a concentration of 0.005% by mass or more and 10% by mass or less:

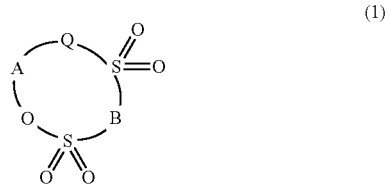

(1)

wherein Q represents an oxygen atom, methylene group, or a C—S single bond; A represents substituted or unsubstituted alkylene group having 1 to 5 carbon atoms; carbonyl group; sulfinyl group; substituted or unsubstituted fluoroalkylene group having 1 to 6 carbon atoms; or divalent group having 2 to 6 carbon atoms in which a plurality of alkylene units, a plurality of fluoroalkylene units, or an alkylene unit and a fluoroalkylene unit are bonded through an ether bond; and B represents substituted or unsubstituted alkylene group; substituted or unsubstituted fluoroalkylene group; or an oxygen atom;

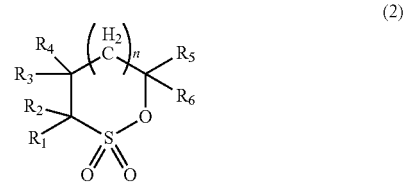

(2)

wherein n represents an integer of 0 or more and 2 or less; and $R_1$ to $R_6$ each independently represent a hydrogen atom, alkyl group having 1 or more and 12 or less carbon atoms, cycloalkyl group having 3 or more and 6 or less carbon atoms, or aryl group having 6 or more and 12 or less carbon atoms.

Patent Literature 2 discloses a non-aqueous secondary battery, wherein the positive electrode consists of a 4-V class active material, and a substance having a peak at 55.0 eV and also a peak at 168.6 eV in XPS analysis exists on the negative electrode surface. The literature states that the peak at 55.0 eV is assigned to a lithium sulfur compound, a peak at 168.6 eV forms a film having a $SO_2$ bond, and the film having a $SO_2$ bond is stable and ion conductive, and has an effect of suppressing decomposition of the electrolyte.

Non Patent Literature 1 suggests a compound comprising an $SO_x$ structure as shown in FIG. 1 as a reaction product of 1,3-propanesultone on the carbon negative electrode.

CITATION LIST

Patent Literature

Patent Literature 1: International Publication No. WO 2005/029613
Patent Literature 2: Japanese Patent Laid-Open No. 2000-123880

Non Patent Literature

Non-Patent Literature 1: Electrochemical and Solid-State Letters, 9(4) A196-A199 (2006)

SUMMARY OF INVENTION

Technical Problem

However, a battery that has a film formed on the negative electrode surface and including a large amount of a compound having the $SO_x$ structure as described above does not have a sufficient capacity retention after the charge and discharge cycle of the battery, and further improvements have been desired.

Solution to Problem

An aspect of the present invention relates to a lithium secondary battery, wherein a peak at 167 to 171 eV and a peak at 162 to 166 eV are present in XPS analysis of sulfur (S2p) of a positive electrode surface, and P169/P164 is in the range of 0.7 to 2.0 wherein the P169/P164 is the ratio between the intensity of the peak at 167 to 171 eV (P169) and the intensity of the peak at 162 to 166 eV (P164).

Advantageous Effects of Invention

The present embodiment can provide a lithium secondary battery having excellent cycle characteristics.

DESCRIPTION OF EMBODIMENTS

Figure 1:
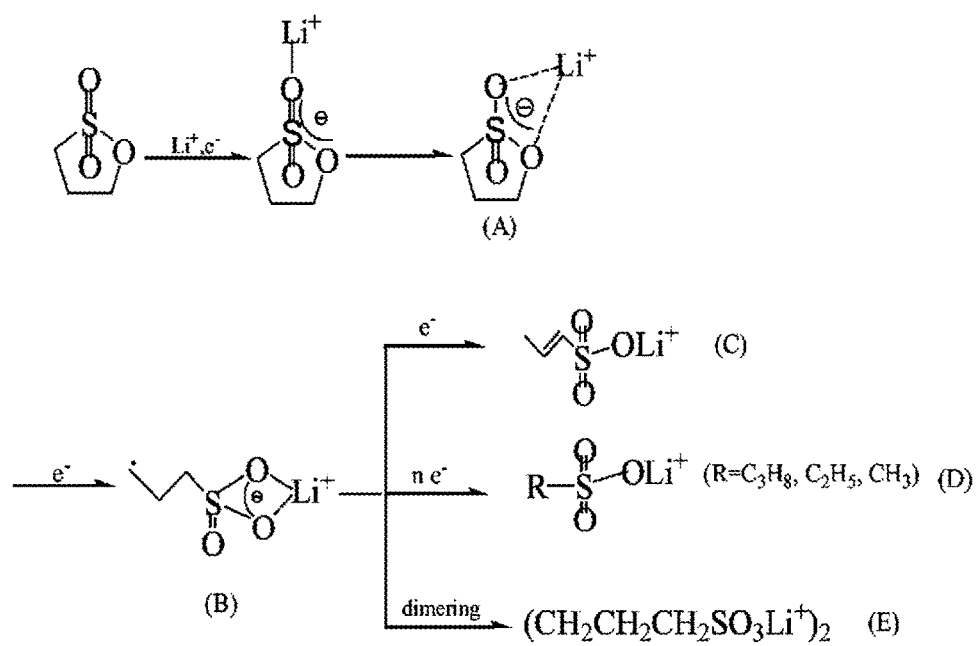
FIG. 1 is a reaction formula of 1,3-propanesultone on a carbon negative electrode described in Non Patent Literature 1.

The lithium secondary battery of the present invention includes a film comprising sulfur formed on its positive electrode surface. On the positive electrode surface, the XPS spectrum of sulfur (S2p) has a peak at 167 to 171 eV (a peak around 169 eV) and a peak at 162 to 166 eV (a peak around 164 eV), and the ratio between the intensity of the peak at 167 to 171 eV (P169) and the intensity of the peak at 162 to 166 eV (P164), P169/P164, is in the range of 0.7 to 2.0. The peak at 162 to 166 eV (the peak around 164 eV) herein is derived from sulfur having a sulfide structure, and the peak at 167 to 171 eV (the peak around 169 eV) is derived from sulfur assigned to $SO_x$. The present inventors have found that a lithium battery having excellent cycle characteristics, for example, an excellent capacity retention ratio after the charge and discharge cycle can be obtained when the ratio between the intensities of two peaks in the sulfur XPS spectrum (P169/P164) of the positive electrode surface is in the range of 0.7 to 2.0. The bonding energy in the XPS spectrum herein is shown as a value standardized using C1s=684.7 eV.

<Electrolyte>

An electrolyte to be used in the present embodiment is preferably a liquid electrolyte (an electrolyte solution).

In the lithium secondary battery of the present embodiment, the electrolyte solution preferably comprises a sulfur compound as an additive. Examples of the sulfur compound include a cyclic disulfonic acid ester represented by the following formula (1), a sultone compound represented by the following formula (2), a γ-sultone compound (Japanese Patent Laid-Open No. 2000-235866), and a sulfolene derivative (Japanese Patent Laid-Open No. 2000-294278).

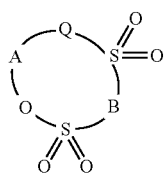

(1)

wherein Q represents an oxygen atom, methylene group, or a C—S single bond; A represents substituted or unsubstituted alkylene group having 1 to 5 carbon atoms; carbonyl group; sulfinyl group; substituted or unsubstituted fluoroalkylene group having 1 to 6 carbon atoms; or divalent group having 2 to 6 carbon atoms in which a plurality of alkylene units, a plurality of fluoroalkylene units, or an alkylene unit and a fluoroalkylene unit are bonded through an ether bond; and B represents substituted or unsubstituted alkylene group; substituted or unsubstituted fluoroalkylene group; or an oxygen atom.

When Q represents a C—S single bond in the formula (1), the C (carbon atom) of the C—S bond is a part of A described above.

Examples of the cyclic disulfonic acid ester represented by the formula (1) include methylene methane disulfonate, ethylene methane disulfonate, and a compound described in International Publication No. WO 2005/029613.

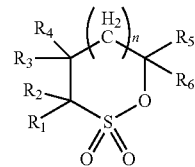

(2)

wherein n represents an integer of 0 or more and 2 or less; and $R_1$ to $R_6$ each independently represent a hydrogen atom, alkyl group having 1 or more and 12 or less carbon atoms, cycloalkyl group having 3 or more and 6 or less carbon atoms, or aryl group having 6 or more and 12 or less carbon atoms.

Examples of the compound represented by the formula (2) specifically include 1,3-propanesultone, 1,4-butanesultone, and a γ-sultone compound (Japanese Patent Laid-Open No. 2000-235866). Among these, 1,3-propanesultone and 1,4-butanesultone are particularly preferred.

An example of other sulfur compound includes a sulfolene derivative (Japanese Patent Laid-Open No. 2000-294278).

In the present embodiment, the sulfur compounds described above may be used singly or in combinations of two or more.

The content of the sulfur compound described above is not particularly limited, but is preferably 0.005% by mass or more and 5% by mass or less in the electrolyte solution. A content of the sulfur compound within this range allows more effective film formation on the positive electrode surface.

The electrolyte solution used in the present embodiment is not particularly limited, but comprises, for example, an electrolyte salt and an non-aqueous electrolyte solvent in addition to the sulfur compounds described above.

Examples of the non-aqueous electrolytic solvent are not particularly limited, but include, from the viewpoint of the stability at the metal lithium potential, cyclic carbonates such as propylene carbonate, ethylene carbonate, butylene carbonate, and vinylene carbonate; linear carbonates such as dimethyl carbonate, diethyl carbonate, ethyl methyl carbonate, and dipropyl carbonate; and lactones such as γ-butyrolactone. The non-aqueous electrolytic solvent may be used singly or in combination of two or more.

Examples of the electrolyte salt include, but are not particularly limited to, lithium salts such as $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, and $LiN(CF_3SO_2)_2$. The electrolyte salt may be used singly or in combination of two or more.

An ionic liquid may also be used as an electrolyte solution. Examples of the ionic liquid include quaternary ammonium-imide salts.

Alternatively, a gel electrolyte in which a polymer such as polyacrylonitrile and polyacrylate is impregnated with an electrolyte solution may also be used.

<Positive Electrode>

A positive electrode can be produced by, for example, mixing a positive electrode active material such as a lithium manganese composite oxide, a positive electrode binder, and a positive electrode electric conductivity imparting agent as required, to prepare a positive electrode slurry, and coating a positive electrode collector with this positive electrode slurry to form a positive electrode active material layer.

<Positive Electrode Active Material>

In the present embodiment, the positive electrode active material preferably comprises sulfur in the range of 100 to 400 ppm. The content of the sulfur contained in the positive electrode active material can be measured by an inductively coupled plasma mass spectrometer (ICP-MS).

The "ppm" herein represents "mass ppm". The content of the sulfur described above represents the content in the lithium secondary battery before charging.

The positive electrode active material is not particularly limited as long as it can deintercalate lithium ions in charging and intercalate them in discharging, and, for example, those known can be used. An example of the positive electrode active material is preferably a lithium transition metal oxide. Examples of the lithium transition metal oxide include, but are not particularly limited to, lithium manganate having a lamellar structure or lithium manganate having a spinel structure such as $LiMnO_2$ and $Li_xMn_2O_4$ (0<x<2); $LiCoO_2$, $LiNiO_2$ and materials in which a part of the transition metal thereof is substituted with another metal; lithium transition metal oxides in which the molar ratio of a specific transition metal is not more than one half such as $LiNi_{1/3}Co_{1/3}Mn_{1/3}O_2$; materials which have an olivine structure such as $LiFePO_4$; and materials which have Li at a larger amount than the stoichiometric amount in these lithium transition metal oxides. Particularly, $Li_\alpha Ni_\beta Co_\gamma Al_\delta O_2$ (1≤α≤1.2, β+γ+δ=1, β≥0.7, γ≥0.2) or $Li_\alpha Ni_\beta Co_\gamma Mn_\delta O_2$ (1≤α≤1.2, β+γ+δ=1, β≥0.6, γ≤0.2) is preferable. These materials may be used singly or in combination of two or more.

The positive electrode according to the present embodiment can also comprise a positive electrode electric conductivity imparting agent and a positive electrode binder in addition to the positive electrode active material.

<Positive Electrode Electric Conductivity Imparting Agent>

Examples of the positive electrode electric conductivity imparting agent include, but are not particularly limited to, carbon materials. Examples of the carbon material include graphite, amorphous carbon, diamond-like carbon, carbon black, Ketjenblack, acetylene black, vapor deposition carbon fiber, fullerenes, carbon nanotubes, and composites thereof. These electric conductivity imparting agents may be used singly, or may be used in combination of two or more. Besides, metal substances such as aluminum, electrically conductive oxide powders and the like can be used.

<Positive Electrode Binder>

Examples of the positive electrode binder that can be used include, but are not particularly limited to, polyvinylidene fluoride, vinylidene fluoride-hexafluoropropylene copolymers, vinylidene fluoride-tetrafluoroethylene copolymers, styrene-butadiene copolymerized rubber, polytetrafluoroethylene, polypropylene, polyethylene, polyimide, and polyamide-imide. Among these, polyvinylidene fluoride (PVdF) is preferred from the viewpoint of versatility and low costs.

The content of the positive electrode binder in the positive electrode active material layer is preferably 1% by mass or more and 25% by mass or less, more preferably 2% by mass or more and 20% by mass or less, and still more preferably 5% by mass or more and 15% by mass or less. The content of the positive electrode binder of 1% by mass or more can prevent electrode delamination from occurring. The content of the positive electrode binder of 25% by mass or less can increase the ratio of the mass of the positive electrode active material, and thus can increase the capacity per mass.

<Positive Electrode Collector>

As the positive electrode collector, aluminum and alloys consisting mainly thereof are preferred from the viewpoint of electrochemical stability. Examples of the shape include foil, a plate shape, and a mesh shape.

<Negative Electrode>

A negative electrode can be produced by, for example, mixing a negative electrode active material, an electric conductivity imparting agent, and a negative electrode binder to prepare a negative electrode slurry, and coating a negative electrode collector with this negative electrode slurry to form a negative electrode active material layer.

<Negative Electrode Active Material>

The negative electrode active material in the present embodiment is not particularly limited as long as it can intercalate lithium ions in charging and deintercalate them in discharging at a potential lower than that of the positive electrode, and those known can be used.

Examples thereof include carbon materials such as natural graphite, artificial graphite, vapor deposition carbon fiber, as well as hard carbon and soft carbon.

In addition to or instead of the carbon materials, lithium alloys such as lithium-aluminum alloys, lithium-lead alloys, and lithium-tin alloys, lithium metal, Si, $SnO_2$, SnO, $TiO_2$, $Nb_2O_3$, SiO and the like, or combinations thereof can be used for the negative electrode. Examples thereof may include oxides such as lithium titanate.

<Negative Electrode Collector>

A negative electrode collector is preferably a metal that forms no alloy with Li. Examples of the metal include copper, nickel, and alloys consisting mainly of them. Examples of the shape of the collector include foil, a plate shape, and a mesh shape.

<Negative Electrode Binder>

Examples of the negative electrode binder that can be used include, but are not particularly limited to, polyvinylidene fluoride, vinylidene fluoride-hexafluoropropylene copolymers, vinylidene fluoride-tetrafluoroethylene copolymers, styrene-butadiene copolymerized rubber, polytetrafluoroethylene, polypropylene, polyethylene, polyimide, and polyamide-imide. The amount of the negative electrode binder used is preferably 7 to 20 parts by mass based on 100 parts by mass of the negative electrode active material from the viewpoint of "sufficient binding power" and "achievement of higher energy," which are in a trade-off relationship.

A negative electrode can be produced by, for example, mixing artificial graphite, an electric conductivity imparting agent, and a negative electrode binder to prepare a negative electrode slurry, and coating a negative electrode collector with this negative electrode slurry to form a negative electrode active material layer.

<Separator>

The separator is not particularly limited, and known separators can be adopted, for example. Examples of the separator that can be used include porous films such as polypropylene and polyethylene, and non-woven fabric. Films of polyimide or alamid, cellulose films and the like can also be used.

<Outer Package>

Any outer package may be used without particular limitation as long as it is stable to the electrolyte solution and has sufficient water vapor barrier properties. As the outer package, for example, cans of metal such as iron and aluminum alloys, laminate films and the like can be used. Preferable laminate films are aluminum- and silica-deposited laminate films from the viewpoint of water vapor barrier properties.

<Battery Structure>

The structure of the lithium secondary battery according to the present embodiment is not particularly limited, and may be, for example, a structure in which an electrode element comprising a positive electrode and a negative electrode arranged to face each other, and an electrolyte solution are accommodated in an outer package. Examples of the shape of the secondary battery include, but are not particularly limited to, a cylindrical type, a flat wound rectangular type, a layered rectangular type, a coin type, a flat wound laminate type, and a layered laminate type.

Figure 2:
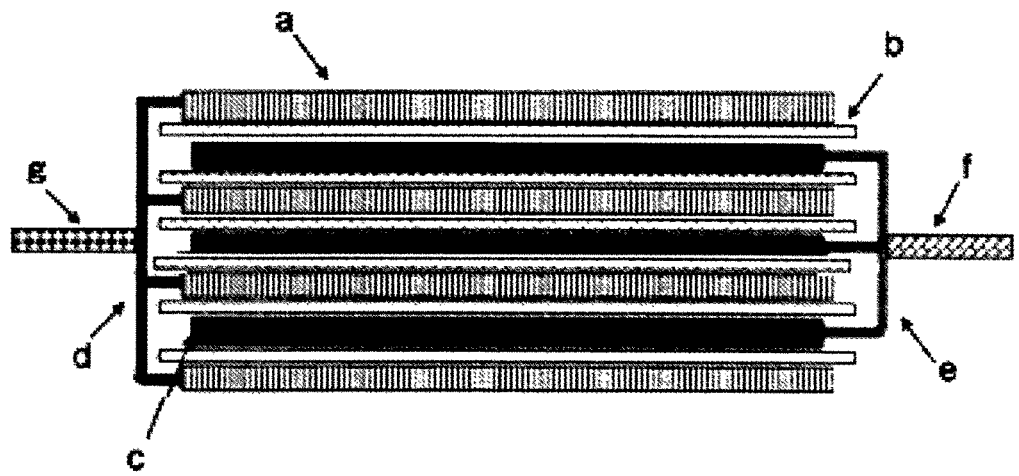
FIG. 2 is a schematic diagram of a laminate package battery.
Figure 3:
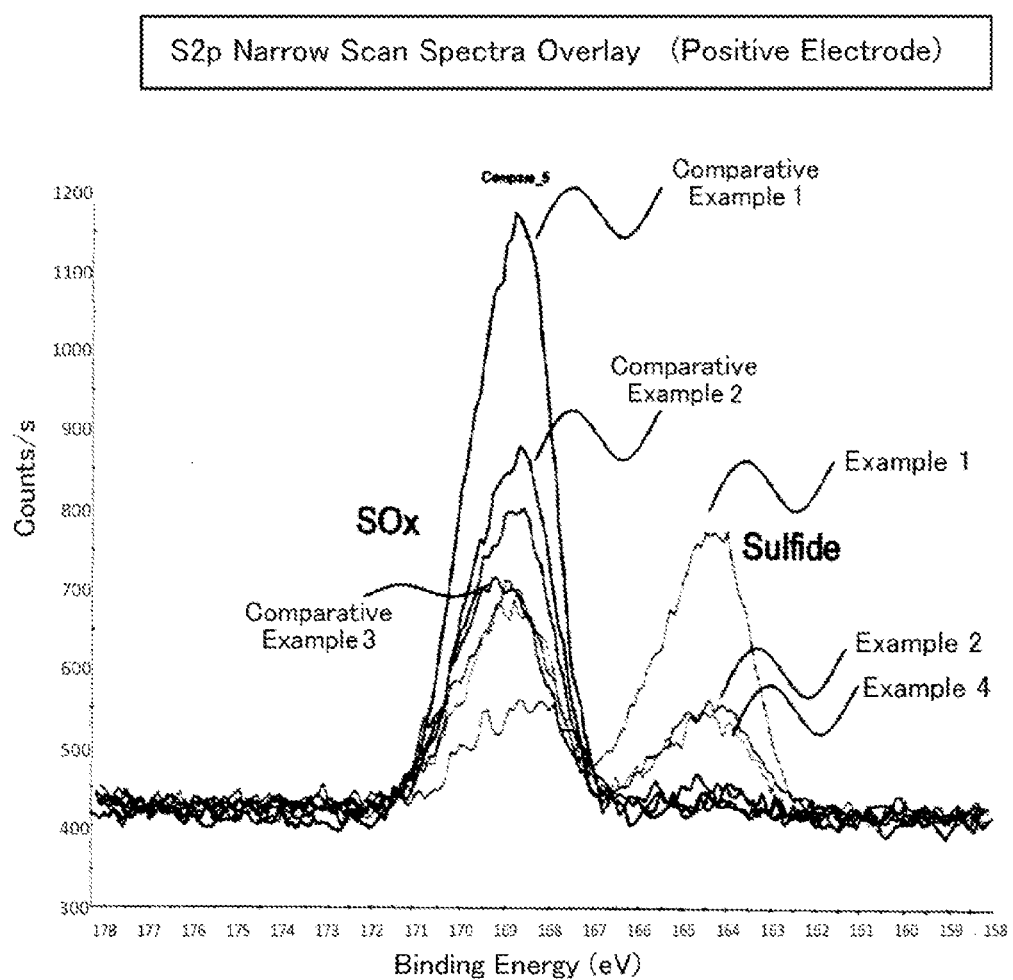
FIG. 3 is an example of XPS spectrum (S2p) of a positive electrode surface.
Figure 4:
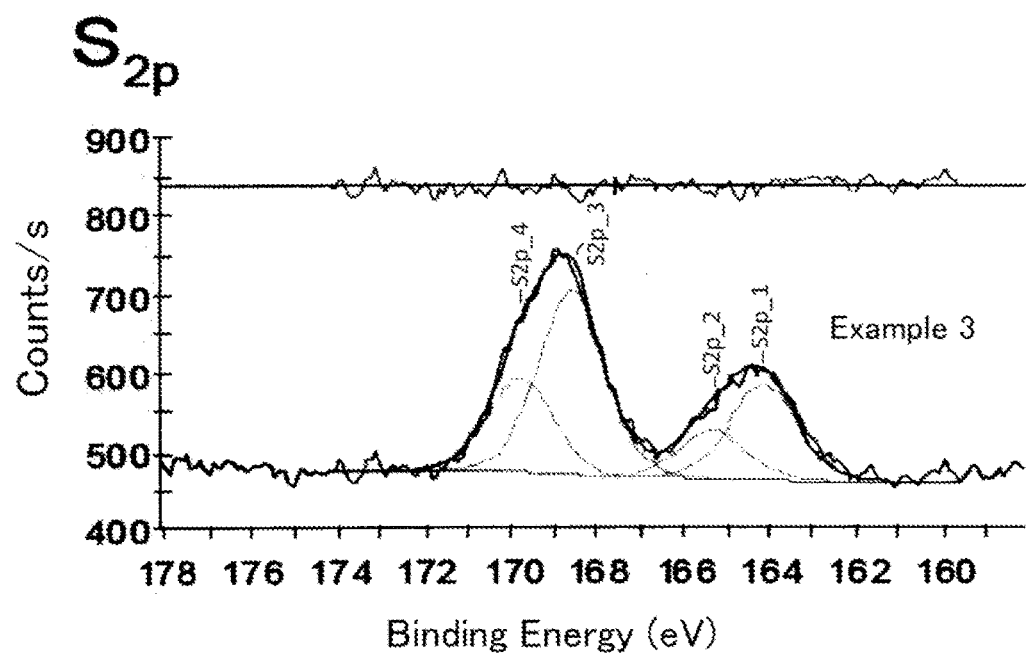
FIG. 4 is an example of XPS spectrum (S2p) of a positive electrode surface.

By way of example, a layered laminate type secondary battery will be described hereinbelow. FIG. 2 is a schematic cross sectional view showing a structure of an electrode element of a layered type secondary battery comprising a laminate film for its outer package. This electrode element is formed by alternately stacking a plurality of positive electrodes c and a plurality of negative electrodes a with separators b being interposed therebetween. Positive electrode collectors e each possessed by the positive electrodes c are mutually welded in the end portion which is not covered with a positive electrode active material to be thereby electrically connected, and further a positive electrode terminal f is welded to the welded portion. Negative electrode collectors d each possessed by the negative electrodes a are mutually welded in the end portion which is not covered with a negative electrode active material to be thereby electrically connected, and further a negative electrode terminal g is welded to the welded portion.

In the present embodiment, a lithium secondary battery in which sulfur exists on its positive electrode surface and the intensity ratio (P169/P164) of the sulfur XPS spectrum (S2p) is in the range of 0.7 to 2.0 can be obtained by preparing a lithium secondary battery using, for example, an electrolyte solution comprising the sulfur compound described above as an additive, a positive electrode comprising a positive electrode active material comprising 100 to 400 ppm of sulfur, and a negative electrode, and charging the battery. Charging conditions are not particularly limited, but the followings are preferable. Charging is preferably performed in the temperature range of 39 to 65° C.; the upper limit voltage, which can be appropriately determined depending on the active material used, is preferably, for example, from 4.1 V to 4.3 V; and the charging mode is desirably the CCCV mode, i.e., a mode in which charging is performed at a constant current until the upper limit voltage is reached, after which, the upper limit voltage is maintained while the current is reduced. The constant charging current until the upper limit voltage is reached is preferably in the range of 0.1 C to 0.5 C. The 0.1 C current means herein a current that, in the case where any of a fully charged battery is discharged at a constant current, requires 10 hours to allow the battery to be fully discharged, and 0.5 C means a current that requires 2 hours to allow the battery to be fully discharged. The charging period is preferably from 6 to 24 hours.

EXAMPLES

Specific examples according to the present embodiment will be described hereinbelow, but the present embodiment is not intended to be limited to these examples.

Example 1

(Production of a Negative Electrode)

SG-BH (manufactured by Ito Graphite Co., Ltd) as a negative electrode carbon material and PVDF (product name: "#2400," manufactured by KUREHA CORPORATION) as a binder were mixed at a mass ratio of 93:7 and dispersed in n-methylpyrrolidone (NMP) to thereby provide a slurry. The mass ratio between NMP and the solid content was 51:49. This slurry, after applied on copper foil having a thickness of 10 μm with a doctor blade, was heated at 110° C. for 7 minutes to dry NMP, and a negative electrode was thereby obtained.

(Production of a Positive Electrode)

Lithium manganate containing 100 ppm of sulfur (the content of the sulfur was measured by ICP-MS), carbon black (product name: "#3030B," manufactured by Mitsubishi Chemical Corporation), and polyvinylidene fluoride (product name: "#2400," manufactured by KUREHA CORPORATION) were each measured out in a mass ratio of 95:2:3. These were mixed with NMP to form a slurry. The mass ratio between NMP and the solid content was 54:46. The slurry was applied on aluminum foil having a thickness of 15 μm with a doctor blade. The aluminum foil with the slurry applied thereon was heated at 120° C. for 5 minutes to dry NMP, to thereby produce a positive electrode.

(Assembly of a Secondary Battery)

To each of the positive electrode and negative electrode produced, an aluminum terminal and a nickel terminal were welded. These were stacked with a separator interposed therebetween to thereby produce an electrode element. The electrode element was packaged with a laminate film, and the electrolyte solution was injected inside the laminate film. Subsequently, the laminate film was sealed by heat fusion while reducing the pressure inside the laminate film. A plurality of flat secondary batteries before initial charging was thus produced. A polypropylene film was used as the separator. An aluminum-deposited polypropylene film was used as the laminate film. As the electrolyte solution, a solution containing 1,3-propanesultone (3 wt %) as the additive, 1.0 mol/l of $LiPF_6$ as the electrolyte, and a mixed solvent of ethylene carbonate and diethyl carbonate (7:3 (volume ratio)) as the non-aqueous electrolytic solvent was used.

(Formation of a Surface Film on the Positive Electrode)

The secondary batteries produced were charged in a thermostatic chamber maintained at 45° C. The upper limit voltage was 4.2 V. The charging was performed in the CCCV mode, and the voltage was maintained constant for an hour after 4.2 V was reached.

(Analysis of the Positive Electrode Surface)

After the secondary batteries produced were discharged to 3.0 V, one battery was selected and disassembled under an argon atmosphere, and the positive electrode was cut out and introduced into an XPS analyzer without being exposed to the atmosphere. The result obtained in XPS analysis is shown in Table 1.

(Charge and Discharge Cycling Test on the Secondary Battery)

The secondary batteries produced were subjected to charge and discharge cycling test in a thermostatic chamber maintained at 45° C. The battery voltage was in the range from 3.0 to 4.2 V, charging was performed in the CCCV mode, and the voltage was maintained constant for an hour after 4.2 V was reached. Discharging was performed in the CC mode (at the constant current of 1.0 C). The 1.0 C current means herein a current that, in the case where any of a fully charged battery is discharged at a constant current, requires 1 hour to allow the battery to be fully discharged. The number of the charge and discharge cycle when the discharge capacity became 30% or less relative to that of the first cycle is shown in Table 1.

Example 2

Batteries were produced and subjected to XPS analysis and cycling test as in Example 1 except that lithium manganate containing 100 ppm of sulfur as the positive electrode active material was replaced with lithium cobaltate containing 200 ppm of sulfur, and 1,3-propanesultone as the electrolyte solution additive was replaced with methylene methane disulfonate (MMDS).

Example 3

Batteries were produced and subjected to XPS analysis and cycling test as in Example 1 except that lithium manganate containing 100 ppm of sulfur as the positive electrode active material was replaced with lithium nickelate containing 400 ppm of sulfur, and 1,3-propanesultone as the electrolyte solution additive was replaced with 1,4-butanesultone, and the temperature at forming a surface film on the positive electrode was increased from 45° C. to 55° C.

Example 4

Batteries were produced and subjected to XPS analysis and cycling test as in Example 1 except that 1,3-propanesultone as the electrolyte solution additive was replaced with MMDS, and the temperature at forming a surface film on the positive electrode was altered from 45° C. to 60° C.

Comparative Example 1

Batteries were produced and subjected to XPS analysis and cycling test as in Example 1 except that the temperature at forming a surface film on the positive electrode was altered from 45° C. to 37° C.

Comparative Example 2

Batteries were produced and subjected to XPS analysis and cycling test as in Example 1 except that lithium manganate containing 100 ppm of sulfur as the positive electrode active material was replaced with lithium manganate containing 50 ppm of sulfur.

Comparative Example 3

Batteries were produced and subjected to XPS analysis and cycling test as in Example 1 except that lithium manganate containing 100 ppm of sulfur as the positive electrode active material was replaced with lithium manganate containing 1000 ppm of sulfur.

The results of Examples and Comparative Examples described above are shown in Table 1.

TABLE 1

| | Positive electrode active material | Sulfur concentration in the positive electrode active material | Electrolyte solution additive | Temperature at film formation | P169/P164 | The number of the charge/discharge cycle that exhibited a discharge capacity of 30% or less to the initial discharge capacity |
|---|---|---|---|---|---|---|
| Example 1 | Lithium manganate | 100 ppm | 1,3-propanesultone | 45 | 0.73 | 1283 |
| Example 2 | Lithium cobaltate | 200 ppm | MMDS | 45 | 0.96 | 2205 |
| Example 3 | Lithium nickelate | 400 ppm | 1,4-butanesultone | 55 | 1.51 | 2153 |
| Example 4 | Lithium manganate | 100 ppm | MMDS | 60 | 1.72 | 1519 |
| Comparative Example 1 | Lithium manganate | 100 ppm | 1,3-propanesultone | 37 | 53 | 385 |
| Comparative Example 2 | Lithium manganate | 50 ppm | 1,3-propanesultone | 45 | 22 | 407 |
| Comparative Example 3 | Lithium manganate | 1000 ppm | 1,3-propanesultone | 45 | 4.6 | 289 |

As shown in Table 1, for each of the batteries of Examples, the P169/P164 value is in the range of 0.7 to 2.0, and the number of the charge and discharge cycle that exhibited a discharge capacity of 30% or less relative to the initial discharge capacity is 1200 or more. In contrast, for each of the batteries of Comparative Examples, the P169/P164 value is more than 2, and the number of the charge and discharge cycle that exhibited a discharge capacity of 30% or less relative to the initial discharge capacity is below 1200.

It is conceivable that this is because the use of a transition metal oxide containing 100 ppm or more of sulfur for the positive electrode and charging at 45° C. or more enabled the additives to react to thereby form a film containing a large amount of sulfur having a sulfide structure on the positive electrode surface.

EXPLANATION OF SYMBOLS a: negative electrode
b: separator
c: positive electrode
d: negative electrode collector
e: positive electrode collector
f: positive electrode terminal
g: negative electrode terminal

The invention claimed is:
1. A lithium secondary battery comprising: a positive electrode having a positive electrode surface, and an electrolyte solution comprising a sulfur compound, as an additive compound, selected from the group consisting of 1,3-propanesultone, 1,4-butanesultone, and methylene methane disulfonate; wherein a peak at 167 to 171 eV and a peak at 162 to 166 eV are present in XPS analysis of sulfur (S2p) of the positive electrode surface, and P169/P164 is in the range of 0.7 to 2.0, wherein the P169/P164 is the ratio between the intensity of the peak at 167 to 171 eV (P169) and the intensity of the peak at 162 to 166 eV (P164); and wherein a positive electrode active material included in the positive electrode comprises sulfur in the range of 100 to 400 ppm.

2. A method for producing a lithium secondary battery comprising a positive electrode having a positive electrode surface, a negative electrode, and an electrolyte solution comprising a sulfur compound selected from the group consisting of 1,3-propanesultone, 1,4-butanesultone, and methylene methane disulfonate, the method comprising:

a step of producing an electrode element by arranging the positive electrode comprising a positive electrode active material comprising sulfur in the range of 100 to 400 ppm, and the negative electrode to face each other; and a step of encapsulating the electrode element, and the electrolyte solution comprising an additive comprising the sulfur compound and a non-aqueous electrolytic solvent in an outer package, and performing charging;

whereby a peak at 167 to 171 eV and a peak at 162 to 166 eV are present in XPS analysis of sulfur (S2p) of the positive electrode surface, and P169/P164 is in the range of 0.7 to 2.0 wherein the P169/P164 is the ratio between the intensity of the peak at 167 to 171 eV (P169) and the intensity of the peak at 162 to 166 eV (P164).

3. The method of producing a lithium secondary battery according to claim 2, wherein the charging is performed at a temperature of 39° C. or more.

* * * * *